(12) United States Patent
Chen

(10) Patent No.: US 12,182,466 B1
(45) Date of Patent: Dec. 31, 2024

(54) DEVICE INTERACTION METHOD, PORTABLE DISPLAY DEVICE, AND NON-TRANSITORY STORAGE MEDIUM

(71) Applicants: Futaijing Precision Electronics (Yantai) Co., Ltd., Yantai (CN); HON HAI PRECISION INDUSTRY CO., LTD., New Taipei (TW)

(72) Inventor: Yan-Jyun Chen, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 18/373,579

(22) Filed: Sep. 27, 2023

(30) Foreign Application Priority Data

Aug. 7, 2023 (CN) .......................... 202310990371.8

(51) Int. Cl.
G06F 3/041 (2006.01)
G06F 3/14 (2006.01)
B60K 35/10 (2024.01)
B60K 35/80 (2024.01)

(52) U.S. Cl.
CPC ............ *G06F 3/1423* (2013.01); *B60K 35/10* (2024.01); *B60K 35/80* (2024.01); *B60K 2360/56* (2024.01)

(58) Field of Classification Search
CPC .......... B60K 28/04; B60N 2/00; B60N 2/002; B60W 2050/143; B60W 2050/146; B60W 2422/00; B60W 2540/00; B60W 2556/45; B60W 50/14; G08B 21/02; G08B 21/22; G08B 21/24; H04L 67/12
See application file for complete search history.

(56) References Cited

U.S. PATENT DOCUMENTS

2014/0043155 A1* 2/2014 Shaw ..................... B60N 2/267
340/457
2016/0280067 A1* 9/2016 Cuddihy ................ B60K 28/04

FOREIGN PATENT DOCUMENTS

CN 104321220 1/2015
CN 113890932 1/2022

* cited by examiner

Primary Examiner — Insa Sadio
(74) Attorney, Agent, or Firm — ScienBiziP, P.C.

(57) ABSTRACT

A device interaction method for achieving a portable display device to interact with a vehicle as a in-vehicle display screen comprises: detecting whether the vehicle is accessed to the portable display device, obtaining a current connection position of the vehicle connected with the portable display device, obtaining a vehicle operation authority matched with the current connection position, receiving a vehicle operation request, and determining whether to interact with the vehicle in accordance with the vehicle operation request based on the vehicle operation authority matched with the current connection position. The portable display device and a non-transitory storage medium are also disclosed.

15 Claims, 3 Drawing Sheets

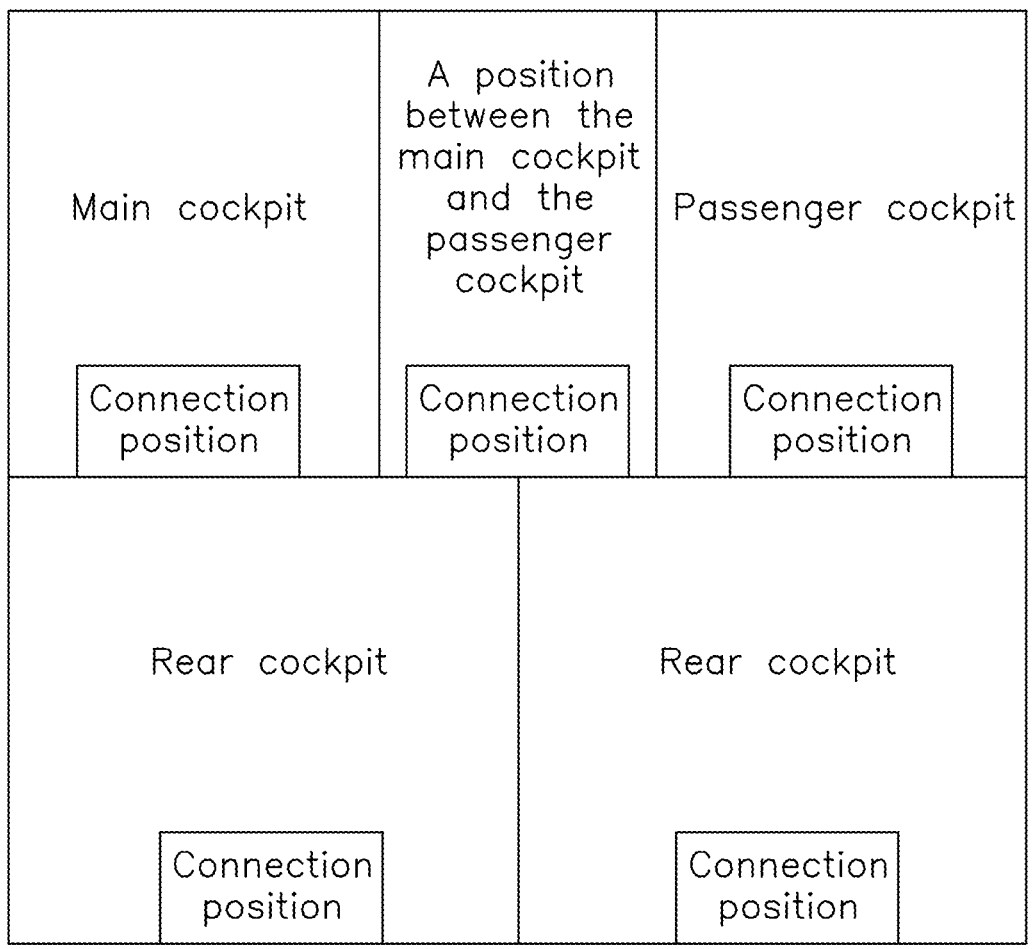

FIG. 3

| If the current connection position between the portable display device and the vehicle is detected to be changed, the portable display device reobtains a vehicle operation authority matched with a changed connection position | ~401 |

| If the portable display device receive a vehicle operation request, the portable display device determines whether to interact with the vehicle in accordance with the vehicle operation request based on the vehicle operation authority matched with the changed connection position | ~402 |

FIG. 4

DEVICE INTERACTION METHOD, PORTABLE DISPLAY DEVICE, AND NON-TRANSITORY STORAGE MEDIUM

TECHNICAL FIELD

The subject matter herein generally relates to portable display devices.

BACKGROUND

Intelligent cockpits comprise in-vehicle products equipped with intelligence and networking, which can intelligently interact with users, roads, and vehicles. In the intelligent cockpit, an in-vehicle display device, such as a central control screen is generally used to realize a interaction between the vehicle and the user, as well as provide entertainment projects for the user, improving a driving experience. When the vehicle leaves the factory, the in-vehicle display device is fixed to a position to provide services for the users.

However, a flexibility of the in-vehicle display device is low after the in-vehicle display device is fixedly arranged in a position, and it is difficult to meet a flexible usage needs of the users.

BRIEF DESCRIPTION OF THE DRAWINGS

Implementations of the present disclosure will now be described, by way of embodiments, with reference to the attached figures.

FIG. 3 is a layout diagram illustrating connection positions of the vehicle according to an embodiment of the present disclosure.

FIG. 4 is a flowchart illustrating the portable display device interacting with the vehicle after a current connection position being changed according to an embodiment of the present disclosure.

DETAILED DESCRIPTION

Figure 1:
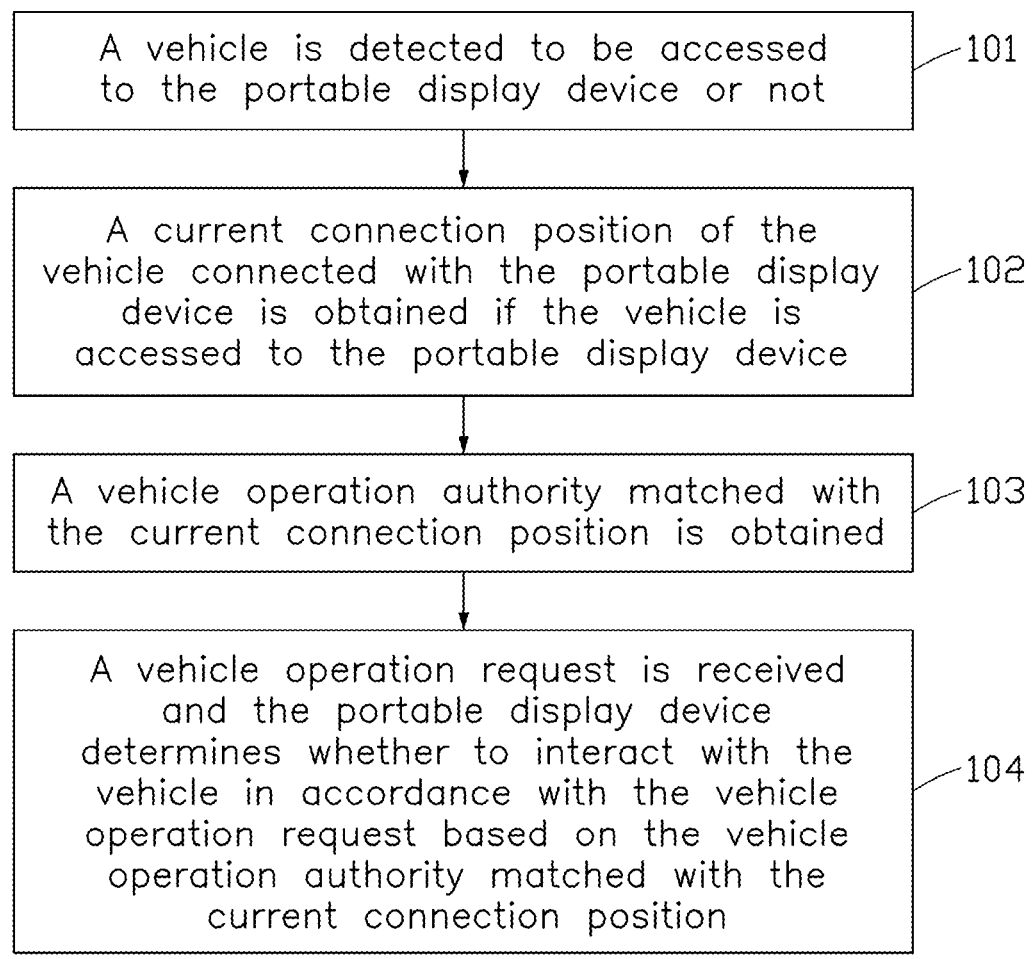
FIG. 1 is a flowchart illustrating a device interaction method according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to;" it specifically indicates open-ended inclusion or membership in the so-described combination, group, series, and the like.

FIG. 1 illustrates one exemplary embodiment of a device interaction method, the method can be applied to a portable display device. The flowchart presents an exemplary embodiment of the method. The exemplary method is provided by way of example, as there are a variety of ways to carry out the method. Each block shown in FIG. 1 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be begin at block 101.

In block 101, a vehicle is detected to be accessed to the portable display device or not.

In one embodiment, the portable display device can detect if itself is accessed to a vehicle. If the portable display device is accessed to the vehicle, the portable display device can be regarded as an in-vehicle display device of the vehicle. The portable display device can interact with a device or a module of the vehicle according an operation request. The operation request can be generated by an operation that a user acts on the portable display device.

In one embodiment, if the portable display device is accessed to the vehicle, it may characterize that the portable display device can communicate with the vehicle, and have an authority to control the device or the module integrated in the vehicle.

In one embodiment, the device or the module integrated in the vehicle may comprise a domain controller, a cockpit controller, an air conditioner, an audio device, a display device, a vehicle positioning module, etc. The display device may comprise other portable display devices acceded to the vehicle and/or in-vehicle display devices fixed in the vehicle.

Figure 2:
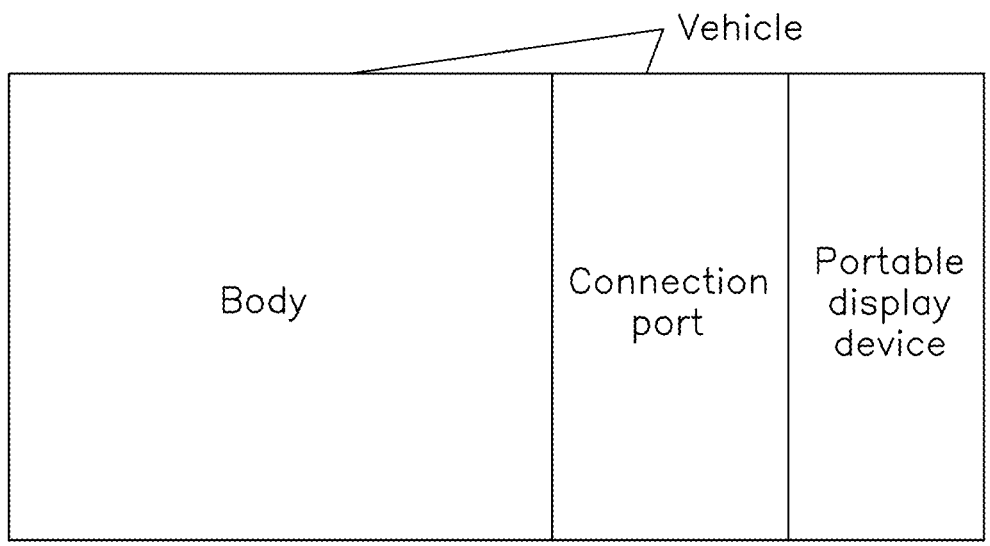
FIG. 2 is a scenario diagram illustrating a portable display device accessed to a vehicle according to an embodiment of the present disclosure.

In one embodiment, the vehicle may comprises one or more connection positions, and the portable display device can access to the vehicle through a connection position. Referring to FIG. 2, each connection position may comprise a connection port, the connection port is fixed on a body of the vehicle. If the portable display device detects to connect to the vehicle through the connection port, the portable display device can determine an accessed vehicle is existing.

In one embodiment, if the portable display device detects to connect to a local area network of a vehicle, the portable display device can display a human-computer interaction prompt about accessing the vehicle or not. For example, a display interface of the portable display device pops up a prompt box of "accessing the vehicle or not", or the portable display device outputs a voice prompt of "accessing the vehicle or not". The portable display device can obtain a response of a user with respect to the human-computer interaction prompt, and determine whether an vehicle is accessed based on the response of the user.

If the portable display device is accessed to the vehicle, the vehicle can transmit vehicle data to the portable display device, which is convenient for the portable display device to provide services for the vehicle based on the vehicle data. For example, the portable display device can control a temperature of the air conditioner of the vehicle according to an operation of the user acting on the portable display device.

In one embodiment, the vehicle data may comprise vehicle model information, temperature information of air conditioner, locking states of doors, etc., data types comprised in the vehicle data can be defined according to an actual application, the embodiments do not limit the data types comprised in the vehicle data.

In block 102, a current connection position of the vehicle connected with the portable display device is obtained if the vehicle is accessed to the portable display device.

The vehicle comprises at least one connection position, the at least one connection position can be configured to connect a portable display device.

Referring to FIG. 3, the connection positions can be arranged in a main cockpit (driver cockpit), a passenger cockpit, a rear cockpit, a position between the main cockpit and the passenger cockpit, etc.

In one embodiment, if the portable display device detects an existence of an accessed vehicle, the portable display device can provide a human-computer interaction interface for selecting a connection position, and the user can select the connection position of the portable display device based on the human-computer interface. The portable display device can obtain the connection position with the vehicle from the human-computer interface.

In one embodiment, if the portable display device connects to the vehicle through the connection port, the block 102 may further comprise: determining an objective connection position corresponding to the connection port, and regarding the objective connection position corresponding to the connection port as the current connection position with the vehicle.

For example, when the portable display device is connected to the vehicle through the connection port, the vehicle sends information of characterizing the connection position corresponding to the connection port to the portable display device, and the portable display device receives the information.

In block 103, a vehicle operation authority matched with the current connection position is obtained.

In one embodiment, each connection position set in the vehicle has a matching relationship with a vehicle operation authority, and the portable display device can obtain the vehicle operation authority matched with the current connection position based on the matching relationship.

In on embodiment, in-vehicle display devices may comprise an instrument screen, a central stack display (CSD), a front passenger screen, a rear screen, etc., all kinds of in-vehicle display devices can be arranged in different positions of the vehicle, and the in-vehicle display devices in different positions can provide different services for users in the vehicle.

For example, the CSD is generally arranged in a middle of the main cockpit and the passenger cockpit. If the current connection position of the portable display device is between the main cockpit and the passenger cockpit, the vehicle operation authority of the portable display device can be equivalent to a vehicle operation authority of the CSD, and the portable display device can be regarded as the CSD.

If the current connection position of the portable display device is in the passenger cockpit, the vehicle operation authority of the portable display device can be equivalent to a vehicle operation authority of the front passenger screen, and the portable display device can be regarded as the front passenger screen.

If the current connection position of the portable display device is in the main cockpit, the vehicle operation authority of the portable display device can be equivalent to a vehicle operation authority of the instrument screen, and the portable display device can be regarded as the instrument screen.

It is understood that the vehicle operation authority matched by the above connection positions are examples for illustrating, and can be set according to the an actual requirement.

The vehicle operation authority of the CSD of the vehicle is generally largest, if the vehicle does not comprise the CSD, the connection position corresponding to the CSD (referred to as a main connection position or a CSD position) is not installed with a portable display device, and the vehicle can output a prompt that the vehicle does not have the CSD.

In one embodiment, if the CSD position is not connected to a portable display device, one portable display device needs to be connected to the CSD position before other portable display devices connected to connection positions other than the CSD position.

After the portable display device is connected to the CSD position, the vehicle can send vehicle data to the portable display device. The portable display device may determine whether vehicle configuration information corresponding to the vehicle is stored. If the portable display device vehicle stores the vehicle configuration information for configuring the vehicle, the portable display device can further determine whether the vehicle configuration information is bound to the vehicle. For example, the portable display device may pop up a prompt box for the user to choose whether to bind. If the user confirm to bound the vehicle configuration information with the vehicle, the vehicle configuration information can be sent to the vehicle by the portable display device.

After the vehicle receive the vehicle configuration information, the portable display device can control the vehicle based on the vehicle configuration information. For example, the portable display device can open a sunroof of the vehicle.

The vehicle configuration information corresponding to the vehicle may comprise an unique configuration information of the vehicle. For example, the vehicle has a sunroof, the vehicle configuration information may comprise an open state of the sunroof, and driving habit data of a driver, the driving habit data can be shared by multiple vehicles. For example, the driving habit data comprises navigation routes commonly used by the driver.

The following embodiments illustrate an application scenario that the CSD position is connected to the portable display device.

If the vehicle is drove by a number of users, such as the vehicle is a public vehicle of an enterprise or a rental vehicle of a vehicle rental company. Many drivers may drive the vehicle, and each driver may comprise different driving habits, if the CSD is fixed in the vehicle, each driver needs to configure the vehicle based on the CSD to make the vehicle meet driving needs or habits.

In the present solution, each driver can access the portable display device with vehicle configuration information to the CSD position of the vehicle when using the vehicle, avoiding to reconfigure the vehicle. Furthermore, when the driver uses different vehicles, the portable display device can be accessed to corresponding CSD position to synchronize the vehicle configuration information, avoiding to repeat a configuration operation.

After the portable display device is connected to the connection position other than the CSD position (the connection position other than the CSD position may be referred to as a central display device (CDD) position), a controller integrated in the vehicle can send device information of the CSD and the vehicle data to the portable display device connected the CDD position. The CSD can be the self-integrated CSD of the vehicle or the portable display device connected by the CSD position. The portable display device connected the CDD position can receive the device information of the portable display device connected the CSD position and the vehicle data.

In one embodiment, the device information of the CSD may comprise account information of the CSD, identification information of the CSD, and navigation routes commonly used by drivers.

The present embodiments can realize synchronizations of the vehicle data and the device information of the CSD, the accessed portable display device can be used as a in-vehicle display screen, combined with vehicle-related information to provide services for users.

It is understandable that the vehicle has a higher requirement for software and hardware configurations of the CSD than in-vehicle display screens in other areas. Compared with the portable display device that can only be connected to the CDD position, the portable display device that can be connected to the CSD position as the CSD has higher software and hardware configurations. That is, the portable display device that can be connected to the CSD position can be backward compatible and connected to the CDD position.

That is, the portable display device used as the CSD can be connected to both the CDD position and the CSD position in the vehicle.

For example, a first portable display device is connected to the CSD position of the vehicle, and the user can move the first portable display device to connect to a first CDD position of the vehicle, or a second CDD position of other vehicles.

For example, the portable display device connected to the CDD position can consider the portable display device connected to the CSD position as a host. When sharing authorities of video and audio are enabled, the portable display device connected to the CDD position can send video and audio date to the portable display device connected to the CSD position.

In one embodiment, video and audio data of multiple portable display devices connected to the vehicle can be shared to enhance a use experience.

A portable display device that can be connected to the CSD position, which can also be connected to the CDD position. A portable display device that can only be connected to the CDD position, characterizing the portable display device having low software and hardware configuration, the portable display device can not meet software and hardware configuration requirements of the CSD of the vehicle, the portable display device can not achieve upwardly compatible, and the portable display device cannot connect to the CSD position as the CSD.

After the portable display device is connected to the vehicle, the portable display device can provide services for the user in the vehicle. For example, the portable display device provides a human-computer interaction interface for the user to operate on the human-computer interaction interface, or provides a voice interaction, receives a voice message related to an operation request generated by the user, or perceives gesture information of the user, determines an operation request through analyzing the gesture information of the user.

In block 104, a vehicle operation request is received and the portable display device determines whether to interact with the vehicle in accordance with the vehicle operation request based on the vehicle operation authority matched with the current connection position.

In one embodiment, the vehicle operation request may comprise a door unlocking request, a temperature adjustment request of the air conditioner, a window opening or closing request, a ventilation system opening or closing request, a multi-screen linkage request, an audio playback request, a video playback request, etc.

In one embodiment, if the portable display device determines that a vehicle operation represented by the vehicle operation request is within the matched vehicle operation authority, the portable display device can interact with the vehicle in accordance with the vehicle operation request. For example, the portable display device sends information for adjusting a temperature of the air conditioner of the vehicle.

If the portable display device determines that the vehicle operation represented by the vehicle operation request is not within the matched vehicle operation authority, the portable display device does not interact with the vehicle in accordance with the vehicle operation request.

For example, the portable display device can provide a human-computer interface with respect to vehicle operation, and all types of vehicle operations can be displayed in the human-computer interaction interface. First vehicle operations which are not within the matched vehicle operation authority are displayed in a first display mode, such as displayed in a gray font, or not displayed. Second vehicle operations which are within the matched vehicle operation authority are displayed in a second display mode, such as displayed in a black font, so that the user can distinguish whether a vehicle operation is within the matched vehicle operation authority in the human-computer interface based on different display modes.

When the user select a vehicle operation based on the human-computer interaction interface, the portable display device can receive the vehicle operation request of the user based on the human-computer interaction interface. If the vehicle operation request corresponds to the first vehicle operation displayed by the first display mode, the portable display device may not process the vehicle operation request, if the vehicle operation request corresponds to the second vehicle operation displayed by the second display mode, the portable display device may send the vehicle operation request to a relevant electronic device/module of the vehicle to perform a relevant operation (corresponds to the vehicle operation request) of the vehicle.

In one embodiment, if the matched vehicle operation authority comprise a multi-screen linkage operation authority, the portable display device can realize a multi-screen linkage with in-vehicle display devices.

In one embodiment, when the portable display device detects to access a vehicle, the portable display device can receive device information of in-vehicle display devices of the vehicle. If the vehicle operation authority matched with the current connection position comprises a multi-screen linkage operation authority, and the vehicle operation request comprises a multi-screen linkage request, the portable display device can be operated in a multi-screen linkage mode with the in-vehicle display devices of the vehicle based on device information of in-vehicle display devices of the vehicle.

In one embodiment, the multi-screen linkage request comprises identification of in-vehicle display devices for multi-screen linkage. The in-vehicle display devices for multi-screen linkage may comprise other portable display devices accessed to the vehicle and/or display devices fixedly arranged in the vehicle.

After the portable display device access to the vehicle, the portable display device may be disconnected from the vehicle in some cases. If the portable display device is disconnected from the vehicle, characterizing that the portable display device is changed from an access state to a non-access state.

For example, the user can log out the current accessed vehicle on a user interface of the portable display device, and the portable display device can obtain a logout message from the user interface and disconnect from the current accessed vehicle. For example, an abnormal condition (such as a communication failure) is occurred between the portable display device and the current accessed vehicle, causing a disconnection between the portable display device and the current accessed vehicle.

When the portable display device is disconnected from the current vehicle, the portable display device can reconnect to the current vehicle or connect to another vehicle, achieving a flexible accessing of the portable display device.

In some application scenarios, users may have a need to remotely control vehicles. If the portable display device is outside the vehicle, such as the user carries the portable display device outdoors or in a shopping mall, the portable display device can obtain a remote operation authority of the vehicle. The portable display device can respond the vehicle operation request based on the remote operation authority.

In one embodiment, identifying whether the portable display device is outside the vehicle can be determined by a positioning technology, or by other technologies.

The remote operation authority is an operating authority unlocked by the portable display device when the portable display device is outside the vehicle, so that the portable display device can remotely control the vehicle. For example, the portable display device remotely monitoring the vehicle, remotely adjusting a temperature of the air conditioner.

In one embodiment, each connection position of the vehicle can comprise a connection port, the portable display device is connected to the vehicle in a wired communication through the connection port. After the portable display device is connected to the vehicle through the connection port, once the portable display device is detached from the connection port, the portable display device may further interact with the vehicle by a wireless communication connection.

In one embodiment, if the portable display device is detached from the connection port and the portable display device is accessed to the vehicle by the wireless communication connection, the current connection position of the portable display device will not change, and the vehicle operation authority matched with the current connection position will not change.

In a case of the in-vehicle display device fixed installed in the vehicle, difference passengers or difference drivers have difference heights, the passengers or drivers may need to lean forward to use the in-vehicle display device. In the present embodiment, when the portable display device is detached from the connection port, the portable display device is still located within a communication range of the vehicle, the portable display device can interact with the vehicle through the wireless communication connection, to maintain the access state of the portable display device, and the portable display device can be shared to other users to operate or view.

In one embodiment, if a first portable display device is detached from the connection port and determines the connection port connected to a second portable display device, the first portable display device is disconnected from the vehicle.

The first portable display device determining that the connection port is connected with the second portable display device may comprise: the vehicle sending a prompt message to the first portable display device if the connection port is connected to the second portable display device. The prompt message indicates that the connection port exists a new portable display device accessed to the vehicle, the first portable display device is disconnected from the vehicle.

The first portable display device determining that the connection port is connected with the second portable display device may comprise: the first portable display device cannot maintaining a communication connection with the vehicle if the connection port is connected to the second portable display device, and the first portable display device is disconnected from the vehicle.

For example, a first connection port is located in the passenger cockpit, the first portable display device is connected to the first connection port. After the first portable display device is detached from the first connection port, the first portable display device still has the vehicle operation authority matched with the first connection port of the passenger cockpit. However, when the second portable display device is connected to the first connection interface, the second portable display device is accessed to the vehicle, and the second portable display device will have the vehicle operation authority matched with the first connection port of the passenger cockpit, and the first portable display device will be disconnected from the vehicle.

When the first portable display device is disconnected from the vehicle, a prompt can be generated (the prompt can be generated by the first portable display device or the vehicle) about the first portable display device disconnecting with the vehicle, so that the user can know disconnecting information.

The portable display device described in the embodiments can be connected to different vehicles. When the portable display device is accessed to a vehicle, the portable display device can determine a vehicle operation authority based on the current connection position of the vehicle, the portable display device can be used as an in-vehicle display device to provide a human-computer interaction service that matches the current connection position of the vehicle. The flexibility of the in-vehicle display device can be improved, and the user can also determine whether to connect the portable display device to the vehicle according to a configuration requirement of in-vehicle display device, to meet an elastic needs of the user for in-vehicle display device.

In one embodiment, the vehicle may comprise a plurality of connection ports. Referring to FIG. 4, after the portable display device is accessed to the vehicle, the device interaction method may further comprise block 401 and block 402.

In block 401, if the current connection position between the portable display device and the vehicle is detected to be changed, the portable display device reobtains a vehicle operation authority matched with a changed connection position.

In block 402, if the portable display device receive a vehicle operation request, the portable display device determines whether to interact with the vehicle in accordance with the vehicle operation request based on the vehicle operation authority matched with the changed connection position.

In one embodiment, the connection position between the portable display device and the vehicle can be changed to provide corresponding services matched with different connection positions, an experience of the user can be improved.

The device interaction method has at least one following effects. Vehicle owners can access the portable display device to the vehicle according to an actual need, and configure the portable display device to access different connection positions according to application requirements in different scenarios, to achieve flexible combination and configuration of in-vehicle display devices of the vehicle. The portable display device can be shared with others people to operation or view, providing flexible operation methods, and the portable display device can also be taken away from the vehicle for other purposes after leaving the vehicle. The portable display device can store vehicle configuration information, driving habit data, etc., and the portable display device can quickly adjust the vehicle when accessed to the vehicle to meet operational needs of different drivers.

Figure 5:
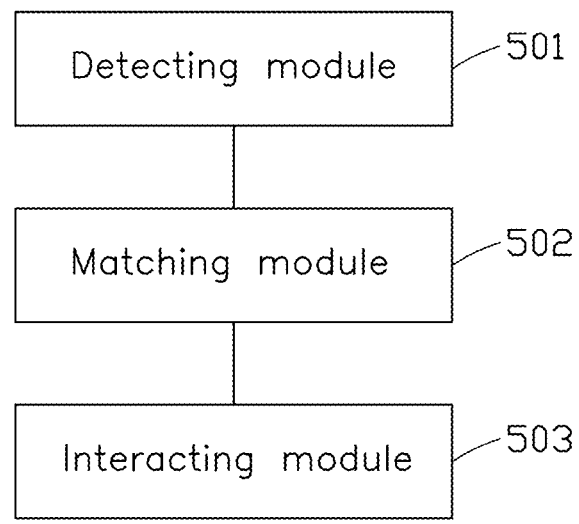
FIG. 5 is a block diagram illustrating an interaction device according to an embodiment of the present disclosure.

FIG. 5 illustrates one exemplary embodiment of a device interaction device. The device interaction device may comprise a plurality of modules, such as a detecting module 501, a matching module 502, and an interacting module 503. The modules 501-503 can comprise one or more software programs in the form of computerized codes stored in a data storage. The computerized codes can include instructions that can be executed by a processor to provide functions for the modules 501-503.

The detecting module 501 is configured to detect whether a vehicle is accessed and obtain a current connection position of the vehicle connected with the portable display device in response to the vehicle being accessed to the portable display device.

The matching module 502 is configured to obtain a vehicle operation authority matched with the current connection position.

The interacting module 503 is configured to receive a vehicle operation request and determine whether to interact with the vehicle in accordance with the vehicle operation request based on the vehicle operation authority matched with the current connection position.

Figure 6:
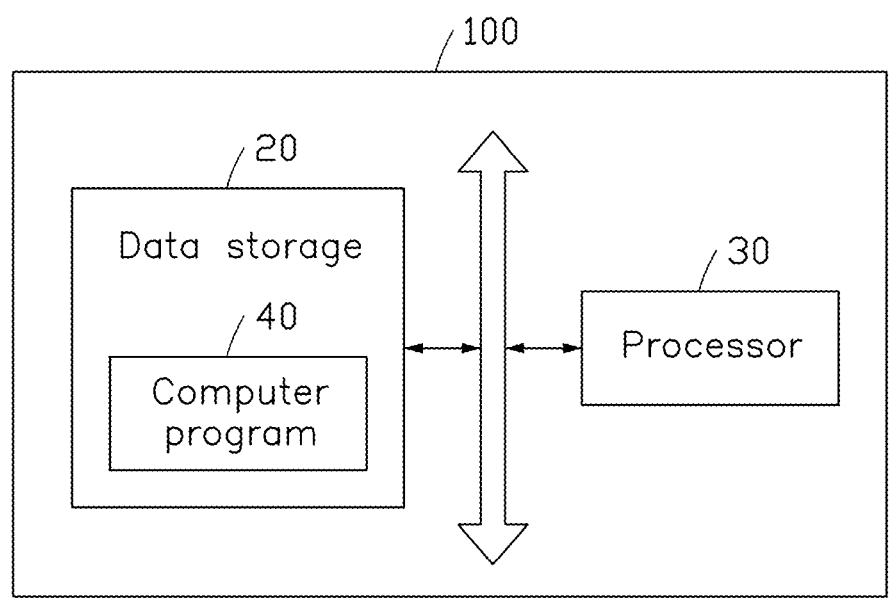
FIG. 6 is a block diagram illustrating the portable display device according to an embodiment of the present disclosure.

FIG. 6 illustrates one exemplary embodiment of the portable display device. Referring to FIG. 6, the portable display device 100 may comprise a data storage 20 and a processor 30. The data storage 20 is configured to store one or more computer programs 40. The one or more computer programs 40 are configured to be executed by the processor 30. The one or more computer programs 40 comprise instructions, and the instructions is capable of being executed by the portable display device 100 to implement the device interaction method.

In one embodiment, the instructions can be divided to the detecting module 501, the matching module 502, and the interacting module 503.

It can be understood that the structure shown in FIG. 6 does not constitute a limitation on the portable display device 100. In other embodiments, the portable display device 100 may comprise more or fewer components than shown in FIG. 6, or combine some components, or separate some components, or arrange different components.

The processor 30 may comprise one or more processing units, for example, the processor 30 may comprise an application processor (AP), a modem, a graphics processing unit (GPU), an image signal processor (ISP), a controller, a video codec, a digital signal processor (DSP), a baseband processor, and/or a neural network processing unit (NPU), etc. Different processing units may be independent components, or may be integrated in one or more processors.

A memory may also be integrated in the processor 30 for storing instructions and data. In some embodiments, the memory integrated in processor 30 is a cache memory. The memory may store instructions or data that the processor 30 has just used or recycled. If the processor 30 needs to use the instruction or data again, it can be directly recalled from the memory, and a repeated store and read is avoided. A waiting time of the processor 30 is reduced, and an efficiency of the system is improved.

In one embodiment, the processor 30 may comprise one or more interfaces. The interfaces may comprise an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, and/or a universal serial bus (USB) interface, etc.

In one embodiment, the data storage 20 may comprise a high-speed random access memory, and may also comprise a non-volatile memory, such as a hard disk, an internal memory, a plug-in hard disk, a smart media card (SMC), a secure digital (SD) card, a flash card, at least one magnetic disk memory, a flash memory, or other non-volatile solid-state memory.

In one embodiment, a non-transitory storage medium recording instructions is also provided. When the recorded computer instructions are executed by a processor of the portable display device 100, the portable display device 100 can perform the device interaction method.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A device interaction method applied to a portable display device, comprising:
   detecting whether a vehicle is accessed to the portable display device, wherein the vehicle is provided with at least one connection position;
   obtaining a current connection position of the at least one connection position connected with the portable display device if the vehicle is accessed to the portable display device;
   obtaining a vehicle operation authority matched with the current connection position; and receiving a vehicle operation request and determining whether to interact with the vehicle in accordance with the vehicle operation request based on the vehicle operation authority matched with the current connection position.

2. The device interaction method of claim 1, wherein after detecting whether the vehicle is accessed to the portable display device, the method further comprises:
determining whether vehicle configuration information is bound to the vehicle if the vehicle configuration information for configuring the vehicle is obtained; and
sending the vehicle configuration information to the vehicle if the vehicle configuration information is determined to bind to the vehicle.

3. The device interaction method of claim 1, wherein the vehicle is further provided with an in-vehicle display device, after detecting whether the vehicle is accessed to the portable display device, the method further comprises:
receiving device information of the in-vehicle display device; and
receiving the vehicle operation request and determining whether to interact with the vehicle in accordance with the vehicle operation request based on the vehicle operation authority matched with the current connection position further comprises:
performing a multi-screen linkage operation with the in-vehicle display device based on the device information of the in-vehicle display device if the vehicle operation authority matched with the current connection position comprises a multi-screen linkage operation authority and the vehicle operation request comprises a multi-screen linkage request.

4. The device interaction method of claim 1, wherein after detecting whether the vehicle is accessed to the portable display device, the method further comprises:
obtaining a remote operation authority of the vehicle if the portable display device is detected outside the vehicle;
responding to the vehicle operation request based on the remote operation authority of the vehicle; and
obtaining the current connection position of the at least one connection position connected with the portable display device comprises:
obtaining the current connection position of the at least one connection position of the vehicle connected with the portable display device if the portable display device is detected inside the vehicle.

5. The device interaction method of claim 1, wherein each of the at least one connection position of the vehicle is provided with a connection port, the portable display device is connected to the vehicle in a wired communication through the connection port, after detecting whether the vehicle is accessed to the portable display device, the method further comprises:
interacting with the vehicle through a wireless communication if the portable display device is detected to be detached from the connection port.

6. The device interaction method of claim 5, wherein after detecting the portable display device is detached from the connection port, the method further comprises:
disconnecting with the vehicle if the connection port is determined to connect another portable display device; and
outputting a message indicating that the portable display device is disconnected to the vehicle.

7. The device interaction method of claim 1, wherein the vehicle is provided with a plurality of connection positions comprising the at least one connection position, after detecting whether the vehicle is accessed to the portable display device, the method further comprises:
reobtaining a vehicle operation authority matched with a changed connection position if the current connection position connected with the portable display device is detected to be changed; and
determining whether to interact with the vehicle in accordance with the vehicle operation request based on the vehicle operation authority matched with the changed connection position.

8. A portable display device comprising:
at least one processor; and
a data storage storing one or more programs which when executed by the at least one processor, cause the at least one processor to:
detect whether a vehicle is accessed to the portable display device, wherein the vehicle comprises at least one connection position;
obtain a current connection position of the at least one connection position connected with the portable display device if the vehicle is accessed to the portable display device;
obtain a vehicle operation authority matched with the current connection position; and
receive a vehicle operation request and determine whether to interact with the vehicle in accordance with the vehicle operation request based on the vehicle operation authority matched with the current connection position.

9. The portable display device of claim 8, wherein the at least one processor is further configured to:
determine whether vehicle configuration information is bound to the vehicle if the vehicle configuration information for configuring the vehicle is obtained; and
send the vehicle configuration information to the vehicle if the vehicle configuration information is determined to bind to the vehicle.

10. The portable display device of claim 8, wherein the vehicle further comprises an in-vehicle display device; the at least one processor is further configured to:
receive device information of the in-vehicle display device;
the at least one processor is configured to receive the vehicle operation request and determine whether to interact with the vehicle in accordance with the vehicle operation request based on the vehicle operation authority matched with the current connection position, is further configured to:
perform a multi-screen linkage operation with the in-vehicle display device based on the device information of the in-vehicle display device if the vehicle operation authority matched with the current connection position comprises a multi-screen linkage operation authority and the vehicle operation request comprises a multi-screen linkage request.

11. The portable display device of claim 8, wherein the at least one processor is further configured to:
obtain a remote operation authority of the vehicle if the portable display device is detected outside the vehicle;
respond to the vehicle operation request based on the remote operation authority of the vehicle;
the at least one processor is configured to obtain the current connection position of the at least one connection position connected with the portable display device, is further configured to:
obtain the current connection position of the at least one connection position of the vehicle connected with the portable display device if the portable display device is detected inside the vehicle.

12. The portable display device of claim 8, wherein each of the at least one connection position of the vehicle comprises a connection port, the portable display device is connected to the vehicle in a wired communication through the connection port, the at least one processor is further configured to:
   interact with the vehicle through a wireless communication if the portable display device is detected to be detached from the connection port.

13. The portable display device of claim 12, wherein the at least one processor is further configured to:
   disconnect with the vehicle if the connection port is determined to connect another portable display device;
   output a message indicating that the portable display device is disconnected to the vehicle.

14. The portable display device of claim 8, wherein the vehicle comprises a plurality of connection positions comprising the at least one connection position, the at least one processor is further configured to:
   reobtain a vehicle operation authority matched with a changed connection position if the current connection position connected with the portable display device is detected to be changed; and
   determine whether to interact with the vehicle in accordance with the vehicle operation request based on the vehicle operation authority matched with the changed connection position.

15. A non-transitory storage medium having stored thereon instructions that, when executed by a processor of a portable display device, causes the portable display device to perform a device interaction method, the device interaction method comprising:
   detecting whether a vehicle is accessed to the portable display device, wherein the vehicle is provided with at least one connection position;
   obtaining a current connection position of the at least one connection position connected with the portable display device if the vehicle is accessed to the portable display device;
   obtaining a vehicle operation authority matched with the current connection position; and
   receiving a vehicle operation request and determining whether to interact with the vehicle in accordance with the vehicle operation request based on the vehicle operation authority matched with the current connection position.

\* \* \* \* \*